April 4, 1961
MASAO KATO
2,978,598
MOTOR AVAILABLE FOR TOYS
Filed April 25, 1957
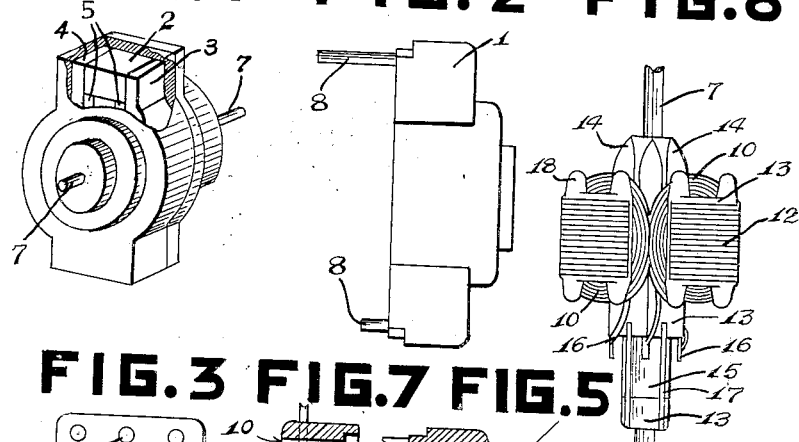
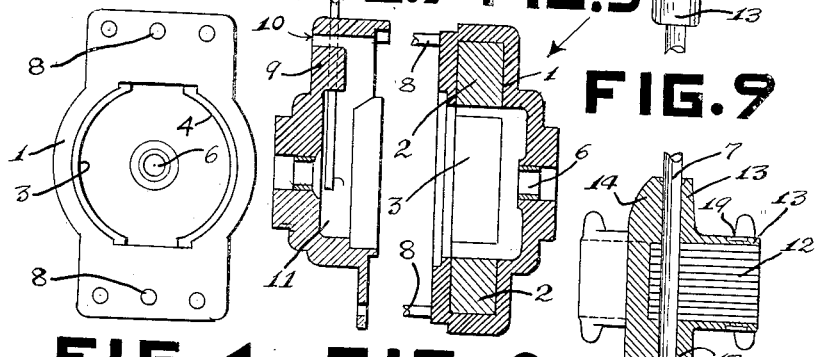
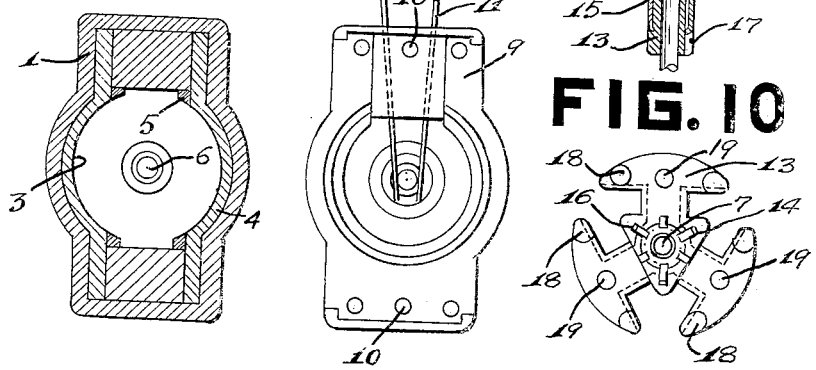
INVENTOR
MASAO KATO
BY Linton and Linton
ATTORNEYS

United States Patent Office 2,978,598
Patented Apr. 4, 1961

2,978,598
MOTOR AVAILABLE FOR TOYS

Masao Kato, 5 Sanchome Azumabashi, Tokyo, Japan

Filed Apr. 25, 1957, Ser. No. 655,025

1 Claim. (Cl. 310—43)

The present invention is concerned with electric motors for use in toys.

The principal object of the invention is to provide electric motors which can be quickly and easily fabricated, are economical to produce and yet will be durable having a long operative life.

Further, objects of the invention will be in part obvious and in part pointed out in the following detailed description of the drawings in which:

Figure 1 is a perspective view of the body of the toy motor according to the present invention with a part of the body broken away for showing the inside of motor.

Figure 2 is a side view of a magnetic field block which forms a part of this invention.

Figure 3 is a front view of the same magnet field block.

Figure 4 is a cross-sectional view of the same magnet field block.

Figure 5 is a further cross-sectional view of the same magnetic field block taken at right angles to Fig. 4.

Figure 6 is a front view of the cover which is connected with said magnetic field block.

Figure 7 is a vertical cross-sectional view of said cover.

Figure 8 is a side view of the completed armature forming part of this invention.

Figure 9 is a vertical cross-sectional view of the armature without the coil.

Figure 10 is a top view of the armature shown in the Figure 9.

Referring now more particularly to the accompanying drawing, numeral 1 indicates a motor casing shield formed of a molded synthetic resin and which has a pair of magnets 2 imbedded therein in the top and bottom portions of said casing between a pair of oppositely curved yokes 3 and 4 imbedded in the sides of said casing by molding said casing around said magnets and yokes during the formation of said casing providing a magnetic field block. Portions 5 of said casing extend below said magnets in the corners formed by said magnets and said yokes for adding rigidity to said casing and retaining said magnets and yokes in position.

6 is the bearing for supporting the shaft 7 of the motor. 8 indicates two rods which are provided in the upper part and lower part of the shield 1, and which extend into the small holes 10 which are made in the cover 9, while 11 indicates the brushes, installed in said cover.

As the next step, the armature is fabricated with iron core 12 and commutator 15 being held on the motor shaft by the synthetic resin body 13 and the iron core is surrounded by the coil 10.

In Figure 8 and Figure 10 14 indicates the hub of the synthetic resin body 13. 16 is a projected piece which connects one edge of the commutator 15 with the coil 10 and 17 indicates the cross section of the commutator piece. 18 indicates stops for preventing the coil 10 from jumping out when the coil is rotated, and 19 indicates a grooved part of the synthetic resin body 13.

The armature is thus composed with the iron core 12 and the commutator 15 completely fixed into synthetic resin body 13 and therefore each element is united so tightly that the position of the respective elements are maintained even after long operation, and besides, the manufacturing process of this motor is relatively simple as each element of the motor is fixed in the most suitable position.

I claim:

An electric motor comprising an open sided hollow block of molded synthetic resin, a pair of magnets embedded in opposite sides of said block, rods embedded in the open side of said block and extending laterally thereof, a cover for mating with said block open side and having openings for receiving said rods, brushes carried by said cover, said block and cover having shaft supporting openings, an armature shaft rotatably mounted in and through said shaft supporting openings, said magnets being positioned within said block with exposed faces thereof being opposite to one another and with each magnet arranged symmetrically to said armature shaft, a body of synthetic resin fixedly provided on said shaft, iron cores embedded in said body and positioned between said magnets, a commutator embedded in said body and positioned for engagement by said brushes and coils surrounding said body about said iron cores and connected to said commutator.

References Cited in the file of this patent

UNITED STATES PATENTS

| | | |
|---|---|---|
| 1,939,615 | Apple | Dec. 12, 1933 |
| 2,181,418 | Cohen et al. | Nov. 28, 1939 |
| 2,453,101 | Schulz | Nov. 2, 1948 |
| 2,465,446 | Gorfin et al. | Mar. 29, 1949 |
| 2,548,133 | Treat | Apr. 10, 1951 |
| 2,659,317 | Bonanno | Nov. 17, 1953 |
| 2,756,354 | Baron | July 24, 1956 |